US008898810B2

(12) United States Patent
Evans et al.

(10) Patent No.: US 8,898,810 B2
(45) Date of Patent: Nov. 25, 2014

(54) HIGH THROUGHOUT REPRODUCIBLE CANTILEVER FUNCTIONALIZATION (71) Applicant: UT-Battelle, LLC, Oak Ridge, TN (US)

(72) Inventors: Barbara R. Evans, Oak Ridge, TN (US); Ida Lee, Oak Ridge, TN (US)

(73) Assignees: UT-Battelle, LLC, Oak Ridge, TN (US); University of Tennesse Research Foundation, Knoxville, TN (US)

( * ) Notice: Subject to any disclaimer, the term of this patent is extended or adjusted under 35 U.S.C. 154(b) by 0 days.

(21) Appl. No.: 14/138,305

(22) Filed: Dec. 23, 2013

(65) Prior Publication Data
US 2014/0123348 A1 May 1, 2014

Related U.S. Application Data (62) Division of application No. 13/613,627, filed on Sep. 13, 2012, now Pat. No. 8,635,711.

(51) Int. Cl.
G01Q 70/02 (2010.01)
G01Q 70/18 (2010.01)
G01Q 60/42 (2010.01)
G01Q 70/06 (2010.01)
B82Y 35/00 (2011.01)

(52) U.S. Cl.
CPC ............ G01Q 60/42 (2013.01); G01Q 70/06 (2013.01); B82Y 35/00 (2013.01); G01Q 70/02 (2013.01); G01Q 70/18 (2013.01)
USPC ........ 850/42; 850/1; 850/52; 850/53; 850/60; 850/61

(58) Field of Classification Search
CPC ....... G01Q 70/18; G01Q 70/02; G01Q 70/06; G01Q 60/42
USPC ................... 850/42, 52, 53, 60, 61
See application file for complete search history.

(56) References Cited

U.S. PATENT DOCUMENTS

| | | | | |
|---|---|---|---|---|
| 6,057,546 A | * | 5/2000 | Braunstein et al. | 850/15 |
| 6,185,992 B1 | * | 2/2001 | Daniels et al. | 73/105 |
| 6,912,893 B2 | * | 7/2005 | Minne et al. | 73/105 |
| 6,945,100 B2 | * | 9/2005 | Kwon et al. | 73/105 |

(Continued)

OTHER PUBLICATIONS

Bastidas, J.C., et al., "Chemical force microscopy of cellulosic fibers", Carbohydrate Polymers, Dec. 2005, vol. 62, Issue 4, pp. 369-378.

(Continued)

Primary Examiner — Michael Logie
(74) Attorney, Agent, or Firm — Scully, Scott, Murphy & Presser, P.C.

(57) ABSTRACT

A method for functionalizing cantilevers is provided that includes providing a holder having a plurality of channels each having a width for accepting a cantilever probe and a plurality of probes. A plurality of cantilever probes are fastened to the plurality of channels of the holder by the spring clips. The wells of a well plate are filled with a functionalization solution, wherein adjacent wells in the well plate are separated by a dimension that is substantially equal to a dimension separating adjacent channels of the plurality of channels. Each cantilever probe that is fastened within the plurality of channels of the holder is applied to the functionalization solution that is contained in the wells of the well plate.

10 Claims, 9 Drawing Sheets

(56) References Cited

U.S. PATENT DOCUMENTS

| | | | |
|---|---|---|---|
| 7,770,231 B2* | 8/2010 | Prater et al. | 850/6 |
| 8,216,746 B2* | 7/2012 | Chun | 430/5 |
| 8,468,611 B2* | 6/2013 | Riedo et al. | 850/33 |
| 8,513,621 B2* | 8/2013 | Nackashi et al. | 250/440.11 |
| 8,519,330 B2* | 8/2013 | Van Berkel et al. | 250/288 |
| 2001/0000279 A1 | 4/2001 | Daniels et al. | |
| 2008/0309688 A1* | 12/2008 | Haaheim et al. | 346/140.1 |
| 2010/0242765 A1* | 9/2010 | Cruchon-Dupeyrat et al. | 101/463.1 |
| 2011/0127427 A1* | 6/2011 | Nackashi et al. | 250/307 |
| 2012/0027947 A1* | 2/2012 | Espinosa et al. | 427/526 |
| 2013/0111635 A1* | 5/2013 | Jeon | 850/6 |

OTHER PUBLICATIONS

Bergenstrahle, M., et al., "Force Pulling of Single Cellulose Chains at the Crystalline Cellulose-Liquid Interface: A Molecular Dynamics Study", Langmuir, Apr. 2009, vol. 25, Issue 8, pp. 4635-4642.

* cited by examiner

HIGH THROUGHOUT REPRODUCIBLE CANTILEVER FUNCTIONALIZATION

CROSS REFERENCE TO RELATED APPLICATION

This application is a divisional of U.S. patent application Ser. No. 13/613,627, filed Sep. 13, 2012, the entire content and disclosure of which are incorporated herein by reference.

REGARDING FEDERALLY SPONSORED RESEARCH OR DEVELOPMENT STATEMENT

This invention was made with government support under Contract Number DE-AC05-00OR22725 between the United States Department of Energy and UT-Battelle, LLC. The U.S. government has certain rights in this invention.

FIELD OF THE INVENTION

The present disclosure relates to cantilever probes employed in atomic force microscopes, and more particularly relates to the functionalizing cantilever probes for use with atomic force microscopes.

BACKGROUND

Atomic force microscopy carried out in tapping mode can provide a high resolution surface map by measuring deflection of a cantilever probe moving across the surface of a sample. Chemical force microscopy (CFM) expands this method to detect chemical bonding forces between chemical groups on the sample surface by attachment of ligands, the sensing molecules, to the probe and measuring the pulling force required to move the cantilever across the sample surface. The typical functionalization scheme includes coating of the cantilever probes with gold and other metals followed by incubation with bifunctional ligands containing one thiol end. In some examples, the desired ligands need to have thiol groups incorporated into their structure by chemical synthesis, or the thiol compound must have an amine or other functional group that will bind or can be coupled to the desired ligand. The thiol compounds used are generally alkane thiols, which are volatile and have an unpleasant odor. A more serious concern is the unstable nature of the gold-thiol bond due to migration on the gold surface as well as oxidation by oxygen in air or displacement through thiol exchange with thiol groups of compounds present in experimental solutions, for example, the amino acid cysteine.

SUMMARY OF THE INVENTION

In one embodiment of the present disclosure, a method for functionalizing cantilever probes is provided that includes providing a holder having a plurality of channels each having a width for accepting a cantilever probe and a plurality of clips each having a beam extending over the plurality of channels. A plurality of cantilever probes are fastened to the plurality of channels of the holder. Each cantilever probe of the plurality of cantilever probes is fastened within each channel of the plurality of channels by the beam for each of the plurality of clips. The wells of a well plate are then filled with a functionalization solution. The adjacent filling wells in the well plate are separated by a dimension that is substantially equal to a dimension separating adjacent channels of the plurality of channels. Each cantilever of the plurality of cantilevers that are fastened within the plurality of channels of the holder is applied to the wells containing the functionalization solution that is present in the well plate.

In another aspect of the present disclosure, a holder for functionalizing cantilevers is provided. In one embodiment, the holder includes a body having a plurality of channels, wherein each channel of the plurality of channels has an opening at a first end of each channel and a base surface at an opposing second end of each channel. The holder may include a plurality of spring clips. Each spring clip of the plurality of spring clips corresponds to each channel of the plurality of channels in the body of the holder. Each spring clip includes a beam having a mount end and a tab end. The mount end of the beam is fastened to the body of the holder at the base surface of each channel in the body. The tab end of the beam contacts a cantilever probe that is positioned within each channel when the tab end is at a first position. The holder may further include a push stud that is in contact with the beam of each spring clip of the plurality of clips between the mount end of the beam and the tab end of the beam. Applying a force to the push stud in a first direction deflects the beam in a first direction to move the tab end of the beam away from the first position to a second position. When the force is removed from the push stud, the beam moves in a second direction to return the tab end of the beam to the first position.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

In some embodiments, the methods and structures that are disclosed herein provide a stable holder for handling fragile cantilever probes for functionalization of the cantilever probes for use in atomic force microscopes (AFM), chemical force microscopes (CFM) and similar microscopy technology. The cantilever probe includes a sharp tip (probe) at its end that is used to scan the specimen surface. The cantilever is typically silicon (Si) or silicon nitride ($Si_3N_4$) with a tip radius of curvature on the order of nanometers (nm). In use, when the tip is brought into proximity of a sample surface, forces between the tip and the sample lead to a deflection of the cantilever. Depending on the situation, forces can be measured using the cantilever probe in the atomic force microscope (AFM) include mechanical contact force, van der Waals forces, capillary forces, chemical bonding, electrostatic forces, magnetic forces, Casimir forces, and solvation forces, etc. Typically, the deflection is measured using a laser spot reflected from the top surface of the cantilever into an array of photodiodes. Other methods that are used include optical interferometry, capacitive sensing or piezoresistive atomic force microscope (AFM) cantilevers.

In some embodiments, the main purposes of functionalization of the cantilever probe is to effectively detect complementary molecules on the material surface of interest by optimizing the interaction between the molecules on the sample surface and those on the atomic force microscope (AFM) probe, i.e., the cantilever probe. There are several factors that should be considered for this purpose. First of all, the molecules on the cantilever probe should withstand mechanical interaction with the sample surface. The fundamental principle of the atomic force microscope (AFM) is to keep the force or the distance between the cantilever probe and the surface molecules constant, so it is natural that a shear stress is applied to the cantilever probe itself, or molecular modifiers added to the cantilever probe, while the cantilever probe is traveling along the surface of the sample. Second, the interaction between the modifier molecules on the tip of the cantilever probe, and the complementary molecules on the sample surface must be maximized to overcome the inherent signal-to-noise ration in such experiments. For example, if a ligand-receptor interaction is to be detected by the atomic force microscope (AFM), the ligand (or receptor) on the cantilever probe must physically contact and strongly interact with the receptor (or ligand) on the sample surface. The extend of this interaction is related to the number of modifier molecules, the extent to which modifier molecules aggregate, and the length and structural rigidity of chemical linkers that connect the ligand (or receptor) to the rigid cantilever probe, as well as whether the modifier molecules at the end of the cantilever probe remain active after the chemical reactions required to functionalize the cantilever probe with them. Another limiting factor can be the orientation of the terminal molecule extending from the cantilever probe. Even though molecules may be active and have the ability to bind the complementary molecule on the sample surface, this binding will not occur unless the binding pockets of the receptor encounters the ligand at the correct orientation, and at an optimal rate/duration of time. Therefore, cantilever functionalization through molecular chemistry is the starting point that is required to generate topographical images that faithfully reproduce the molecular detail of the actual sample surface.

The methods and structures disclosed herein provide a stable holder for handling fragile cantilever probes for functionalization processing that is a substantial improvement over manual dipping of cantilever probes into functionalization solutions using tweezers and forceps and micro test tubes and dishes. In some embodiments, the methods disclosed herein allow for direct functionalization of silicon (Si) and silicon nitride ($Si_3N_4$) cantilevers that is carried out without requiring expensive and time consuming coating with chromium (Cr) and gold (Au) or other metals. In some embodiments, stable surface coating chemistry of reaction of bifunctional silanes, such as APTES (3-Triethoxysilylpropylamine), with silicon (Si) surfaces is used instead of the less stable, oxidation-sensitive gold-thiol attachment. Subsequent attachment of biological molecules as ligands is carried out with established, mild chemical coupling chemistries that form stable covalent bonds, such as coupling of carboxylate and amino groups using water soluble carbodiimides.

In one embodiment, a technique is provided for rapid reproducible functionalization of multiple cantilever probes for atomic force attraction measurements that utilizes a cantilever holder that is suitable for simultaneous dipping of fragile cantilever probes into multiple solutions without damage using standard multiple well plates, such as standard 96-well plates. The cantilever holder design enables high throughout put, uniform functionalization of the probes by multi-step reaction schemes to impart the specificity of choice by chemical attachment of ligand molecules. In some embodiments, the cantilever holder provides for fast preparation of ligand-modified cantilever probes for chemical force measurements and nanoscale mapping using atomic force microscopes and avoids costly metallic coating of the cantilever probes and breakage of the cantilever probes.

Figure 1A:
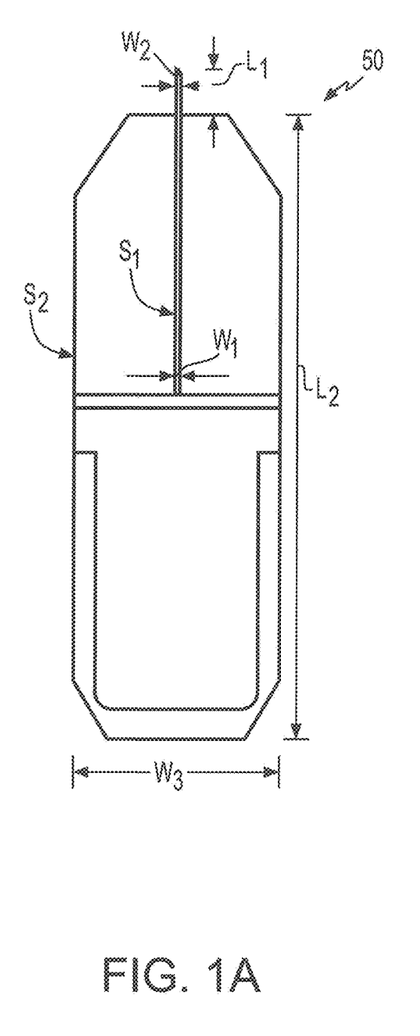
FIG. 1A is a top down perspective view of a cantilever probe, in accordance with one embodiment of the present disclosure.
Figure 1B:
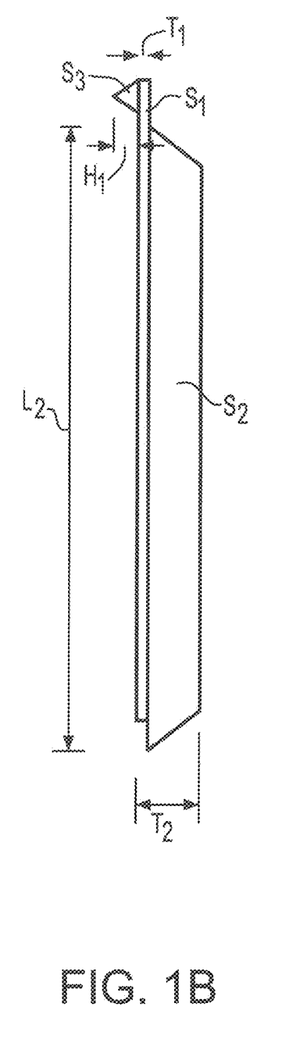
FIG. 1B is a side cross-sectional view of the cantilever probe depicted in FIG. 1A across section line B-B, in accordance with one embodiment of the present disclosure.

FIGS. 1A and 1B depict one embodiment of a cantilever 51 that is present on a chip 52 of a silicon (Si) containing material. The cantilever 51 and the chip 52 are referred to simultaneously throughout the present disclosure as a cantilever probe 50. The cantilever probes 50 are typically formed of a silicon (Si) containing material. For example, some materials for the cantilever probes 50 may be monocrystalline silicon (Si) and silicon nitride ($Si_3N_4$). A number of cantilever 51 geometries have been proposed for use in the cantilever probe 50. In one embodiment, the cantilever 51 may include a rectangular thin bar and triangular lever forms. In some embodiments, the cantilever 51 may be defined on semiconductor chips, i.e., silicon (Si) containing chip, using a subtractive etch process, such as a wet or dry anisotropic etch processes. In other embodiments, the cantilever 51 can be formed on the chip 52 using a growth process, such as epitaxial growth.

In some embodiments, the cantilever 51 cross-section is trapezoidal. The backside width W1 of the cantilever 51 may range from 30 µm to 50 µm. In another embodiment, the backside width W1 of the cantilever 51 may range from 35 µm to 45 µm. The backside width W1 of the cantilever 51 is present at the base of the cantilever 51 that is in contact with the chip 51. The tip of the cantilever 51 is set at the far end of cantilever 51 that is opposite the base of the cantilever 51 and extends past the edge of the chip 52 of the cantilever 51. The tip of the cantilever 51, which is the free end of the cantilever 51, may have a width W2 ranging 20 µm to 40 µm for easy and predictable alignment of the tip and the sample. In another embodiment, the width W2 of the tip of the cantilever 51 may range from 25 µm to 35 µm. The thickness T1 of the cantilever 51 may range from 0.4 µm to 1 µm. A portion of the free end of the cantilever 51 may extend past the edge of the chip 52 by a length L1 that ranges from 50 µm to 500 µm. In another embodiment, the portion of the free end of the cantilever 51 extends past the edge of the chip 52 by a length L1 that ranges from 100 µm to 200 µm.

In some embodiments, the tip of the cantilever 51 includes a protrusion that may be referred to as the probe component 53 of the cantilever probe 50. Two typical geometries for the probe component 53 of the cantilever portion 50 include pyramidal and conical, e.g., cone shaped. In some embodiments, when the probe component 53 of the cantilever probe 50 has a pyramid geometry, the probe component 53 is composed of silicon nitride ($Si_3N_4$). In some embodiments, when the probe component 53 of the cantilever probe 50 has a conical geometry, the probe component 53 is composed of silicon (Si). The height H1 of the probe component 53 may range from 5 µm to 50 µm. In another embodiment, the height H1 of the probe component 53 may range from 10 µm to 20 µm.

The chip 52 that the cantilever 51 is present on can be formed using semiconductor substrate processing, and may be composed of a silicon (Si) containing material. Silicon (Si) containing materials that are suitable for the chip 52 include, but are not limited to, Si, single crystal Si, polycrystalline Si, SiGe, single crystal silicon germanium, polycrystalline silicon germanium, or silicon doped with carbon, amorphous Si and combinations and multi-layers thereof. The length L2 of the chip 52 may range from 3000 µm to 4000 µm. In another example, the length L2 of the chip 52 may range from 3250 µm to 3750 µm. The width W3 of the chip 52 may range from 1000 µm to 2000 µm. In another example, the width W3 of the chip 52 my range from 1250 µm to 1750 µm. The thickness of the chip 52 may range from 200 µm to 400 µm. In another example, the thickness T2 of the chip 52 may range from 250 µm to 350 µm. In one example, the chip 53 may have a thickness T2 that is equal to 300 µm, a length L2 that is equal to 3400 µm, and a width W2 that is equal to 1600 µm.

FIGS. 2A-2I depict one embodiment of a holder 100 for functionalizing cantilever probes. For example, in one embodiment the holder 100 that is depicted in FIGS. 2A-2I may be employed to functionalize the cantilever probes 50 that are depicted in FIGS. 1A and 1B. It is noted that the cantilever probes 50 that are depicted in FIGS. 1A and 1B are provided for illustrative purposes only, and it is not intended that the holder 100 for functionalizing the cantilever probes and its method of use that are described herein be limited to only the cantilever probes 50 that are depicted in FIGS. 1A and 1B. Any cantilever probe is suitable for use with the holder 100 and methods that are disclosed herein.

Figure 2A:
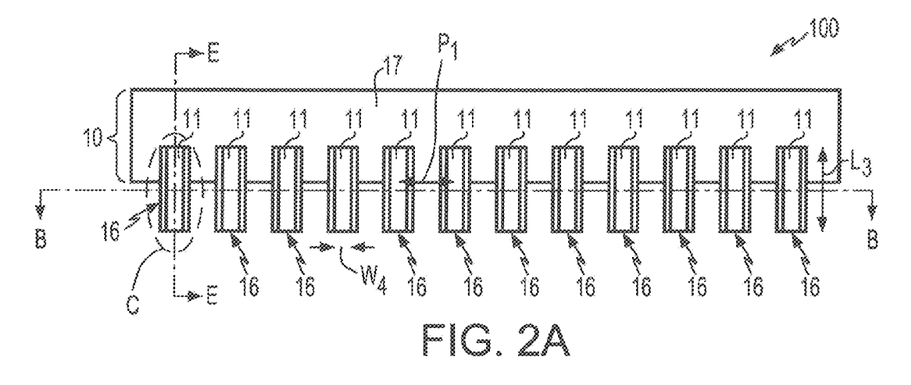
FIG. 2A is a top down perspective view of a holder for functionalizing cantilever probes, in which the holder includes a plurality of spring clips for fastening a plurality of cantilever probes, in accordance with one embodiment of the present disclosure.
Figure 2B:
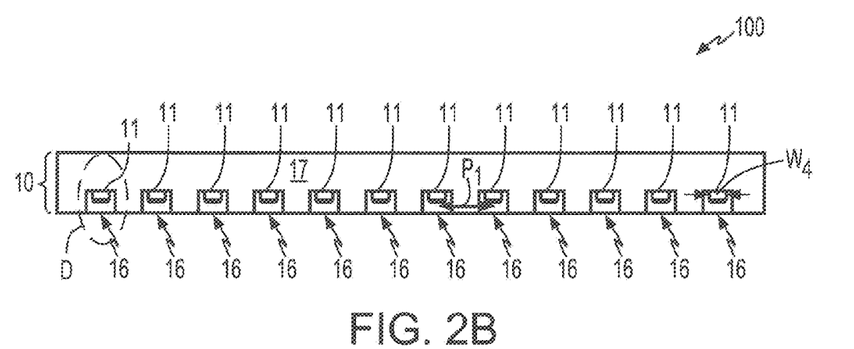
FIG. 2B is a side cross-sectional view of the holder for functionalizing cantilever probes that is depicted in FIG. 2A across cross-section line C-C, in accordance with one embodiment of the present disclosure.

Referring to FIGS. 2A and 2B, in one embodiment, the holder 100 for functionalizing the cantilever probes includes a body 10 having a plurality of channels 11. Each channel 11 of the plurality of channels 11 is present in a platform portion 16 of the body 10 of the body 10 of the holder 100. The each of the platform portions 16 corresponding to a channel 11 of the plurality of channels 11 extends from a base portion 17 of the body 10 of the holder 100. The base portion 17 of the body 10 of the holder 100 interconnects the plurality of platform portions 16 to provide a unitary structure.

The body 10 (including the base portion 17 and the platform portions 16) of the holder 100 may be composed of a metal that is selected from the group consisting of steel, stainless steel, copper, platinum, aluminum and combinations thereof. Examples of stainless steel that are suitable for the holder 100 include 300 series stainless steel that is selected from the group consisting of UNS# S30400 (SST-304), UNS# S30403 (SST-304L), UNS# S31600 (SST-316), UNS# S31603 (SST-316L), UNS# S32100 (SST-321), UNS# S32100 (SST-321), UNS# N08330 (SST-330), UNS# S34700 (SST-347), UNS# S41000 (SST-410), UNS# S43000 (SST-430) and combinations thereof. The body 10 of the holder 100 for functionalizing the cantilever probes may also be composed of a polymer that is selected from the group consisting of polyethylene terephthalate (PET), high density polyethylene (HDPE), polyvinyl chloride (PVC), low density polyethylene (LDPE), polypropylene (PP) and polystyrene (PS).

The channels 11 of the body 10 are employed for positioning the cantilever probes within the holder 100. For example, the dimensions and the geometry of each of the channels 11 may be selected to correspond to the dimensions and geometry of the cantilever probe, such as the cantilever probe 50 that is depicted in FIGS. 1A and 1B. In some embodiments, the channels 11 that are present in the body 10 of the holder 100 may have a quadrilateral geometry, such as a rectangle or square. The number of channels 11 that is present in the holder 100 corresponds to the number of cantilever probes that are to be functionalized. For example, when the cantilever probes are being functionalized using a standard 96 well plate with wells that are in a row of 12 wells, the channels 11 and platform portions 16 of the holder 100 may be equal to 12. Although FIG. 2A depicts a holder 100 including 12 channels 11, the present disclosure is not limited to only this example, as any number of channels 11 may be employed so that any number of cantilever probes can be simultaneously functionalized. For example, the number of channels 11 in the body 10 of the holder 100 may range from 4 to 24. In another example, the number of channels 11 in the body 10 of the holder 100 may range from 6 to 12.

The width W4 of each channel 11 may be selected to contain a cantilever probe. In one embodiment, the width W4 of each channel 11 of the holder 100 depicted in FIGS. 2A-2I may be selected to correspond to the width W3 of the chip 52 of the cantilever probe, as depicted in FIGS. 1A and 1B. For example, in one embodiment, the width W4 for each channel 11 of the holder 100 may range from 1000 µm to 5000 µm. In another embodiment, the width W4 for each channel of the holder 100 may range from 1250 µm to 1750 µm. The length L3 of each channel 11 may be selected to contain a cantilever probe. The length L3 of the channel 11 is also selected to provide that the cantilever probe is submersed into the functionalization solution that is contained within the well of a well plate, but also to ensure that the cantilever probe does not contact the base of the well of the well plate. In one embodiment, the length L3 of the channel 11 may range from 3000 µm to 4000 µm. In another embodiment, the length L3 of the channel 11 may range from 3250 µm to 3750 µm.

The pitch P1 is the dimension that is separating adjacent channels for the plurality of channels 11 in the holder 100. The pitch P1 is the center to center distance between adjacent channels for the plurality of channels 11. The center of the channel 11 for the purpose of determining the pitch P1 is the midpoint of the width W4 for the channel 11. In some embodiments, the pitch P1 separating adjacent channels for the plurality of channels 11 is selected to correspond to the pitch separating adjacent wells in a well plate, such as a standard 96 well plate. For example, in one embodiment, in which the number of channels 11 in the body 10 of the holder 100 is 12 to correspond to the number of wells in a row of a standard 96 well plate, the pitch P1 separating the adjacent channels 11 in the body 10 of the holder 100 may be approximately 9 mm. It is noted that the above example of the pitch P1 separating adjacent channels 11 in the holder 100 is provided for illustrative purposes only, and is not intended to limit the present disclosure to only this example. For example, the pitch P1 separating the adjacent channels 11 may have any dimension, but typically is selected to correspond to the pitch that separates the wells in a well plate. In some examples, the pitch P1 separating the adjacent channels 11 may range from 5 mm to 15 mm. In another example, the pitch P1 separating the adjacent channels 11 may range from 8 mm to 10 mm. In one example, the pitch P1 separating the adjacent channels 11 is equal to 9 mm.

Figure 2C:
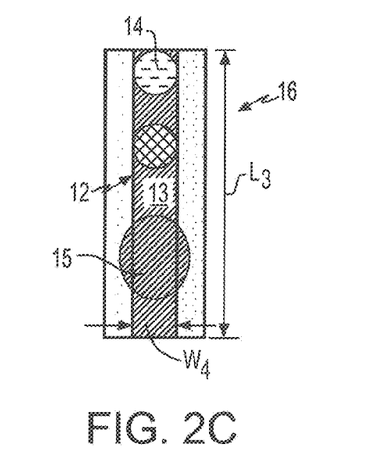
FIG. 2C is a top down view of one spring clip of the holder that is depicted in FIG. 2A, in accordance with one embodiment of the present disclosure.

Each channel 11 has sidewall and base surfaces defined by a platform portion 16 of the body 10, as depicted by FIG. 2C. In some embodiments, each channel 11 of the plurality of channels 11 corresponds to a separate platform portion 16, as depicted in FIGS. 2A and 2B. For example, when the plurality of channels 11 is equal to 12, the number of platform portions 16 for the body 10 of the holder 100 is equal to 12. The outside dimensions of the platform portions 16 of the body 10 of the holder 100 are selected to fit within the wells of the well plate. For example, the width of the outside dimensions for each platform portion 16 may be selected to fit within the width of a well within a well plate. Further, the edge of the platform portion 16 dictates the depth by which the open end FIG. 2C is a magnified view of one channel 11 of the plurality of channels 11 of the holder 100 for holding the cantilever chips during functionalization processing. The holder 100 includes a plurality of spring clips 12. Each spring clip 12 of the plurality of spring clips 12 corresponds to each channel 11 of the plurality of channels 11. As used herein, the term "spring clip" denotes a beam 13 that may be bent, i.e., deformed, when subjected to a force, but is restored to its original shape once the bending force is removed. In one embodiment, each spring clip 12 includes a beam 13 having a mount end 14 and a tab end 15. The beam 13 is positioned over the channel 11 so that the tab end 15 of the beam 13 is proximate to the opening of the channel 11. The mount end 14 of the beam 13 is fastened to the body at the base surface of each channel 11. In one embodiment, the mount end 14 of the beam 13 is fastened to the body using a mechanical fastener, such as screws, nut and bolts, rivets or a combination thereof. In other embodiments, the mount end 14 of the beam 13 may be fastened to the body 11 using an adhesive or welded engagement.

The spring clip 12 may be composed of a metal that allows for the spring clip 12 to be deformed by the application of force, wherein the spring clip 12 returns to its original shape following the removal of the force that caused the deformation. In one embodiment, the metal that provides the spring clip 12 may be a spring steel. Spring steel is a low alloy, medium carbon steel or high carbon steel with a high yield strength, which allows objects made of spring steel to return to their original shape despite significant bending or twist. By "high yield strength" it is meant that the yield strength of the spring steel is greater than 60 ksi. In some examples, the yield strength of the spring steel is 100 ksi. In yet other examples, the spring steel may have a yield strength of 150 ksi.

In one embodiment, the spring steel that is employed for the spring clip 12 may be SAE grade 1074/1075 steel having a carbon (C) content of 0.70% to 0.80%, a manganese (Mn) content of 0.50% to 0.80%, a maximum phosphorus (P) content of 0.040%, a maximum sulfur (S) content of 0.050%, and a remainder substantially of iron (Fe). In another embodiment, the spring steel that is employed for the spring clip 12 may be SAE grade 1095 steel having a carbon (C) content of 0.90% to 1.03%, a manganese (Mn) content of 0.30% to 0.50%, a maximum phosphorus (P) content of 0.040%, a maximum sulfur (S) content of 0.050%, and a remainder substantially of iron (Fe). In yet another embodiment, the spring steel that is employed for the spring clip 12 may be SAE grade 5160 steel (chrome silicon spring steel) having a carbon (C) content ranging from 0.55% to 0.65%, a manganese (Mn) content ranging from 0.75% to 1.00%, a chromium (Cr) content ranging from 0.70% to 0.90%, and a remainder substantially of iron (Fe). In a further embodiment, the spring steel that is employed for the spring clip 12 may be SAE grade 9255 steel having a carbon (C) content ranging from 0.50% to 0.60%, a manganese (Mn) content ranging from 0.70% to 0.95%, a silicon (Si) content ranging from 1.80% to 2.20%, and a remainder of iron (Fe). In an even further embodiment, the spring steel that is employed for the spring clip 12 may be SAE grade 301 string tempered stainless steel (A666) having a carbon (C) content ranging from 0.08% to 0.15%, a maximum manganese (Mn) concentration of 2.00%, a chromium (Cr) content ranging from 16.00% to 18.00%, a nickel (Ni) content ranging from 6.00% to 8.00%, and a remainder substantially of iron (Fe). In addition to spring steel, each spring clip 12 may be composed of tin, aluminum, copper, platinum, titanium, gold or silver. In some embodiments, the spring clips 12 may be coated to ensure that the spring clip 12 does not react with the solution for functionalizing the cantilever probes that are contained within the channels 11 of the holder 100. In other embodiments, the spring clip 12 can be composed of a polymer.

Referring to FIGS. 2D-2I, the thickness T3 of the spring clip 12 is typically selected to provide for the resistance of the spring clip 12 to deformation and the force that the spring clip 12 provides to retain the cantilever probes within the channels 11. In one embodiment, the thickness T3 of the spring clip 12 may range from 0.1 mm to 2 mm. In another embodiment, the thickness T3 of the spring clip 12 may range from 0.2 mm to 1.0 mm. Typically, the length of the spring clip 12 from the mount end 14 of the beam 13 to the tab end 15 of the beam 13 is similar to the length L3 of the channel 11. Similarly, the width of the beam 13 of the spring clip 12 may be similar to the width W4 of the channel 11, as depicted in FIGS. 2A-2C. Referring to FIG. 2C, in some embodiments, the tab end 15 of the beam 13 for the spring clip 12 may have a width that is greater than the width of the remaining portion of the beam 13 for the spring clip 12. In some embodiments, the tab end 15 of the spring clip may have a circular geometry.

Figure 2D:
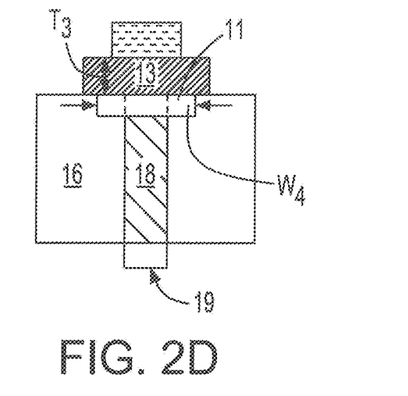
FIG. 2D is a side view of one spring clip of the holder that is depicted in FIG. 2B, in accordance with one embodiment of the present disclosure.
Figure 2E:
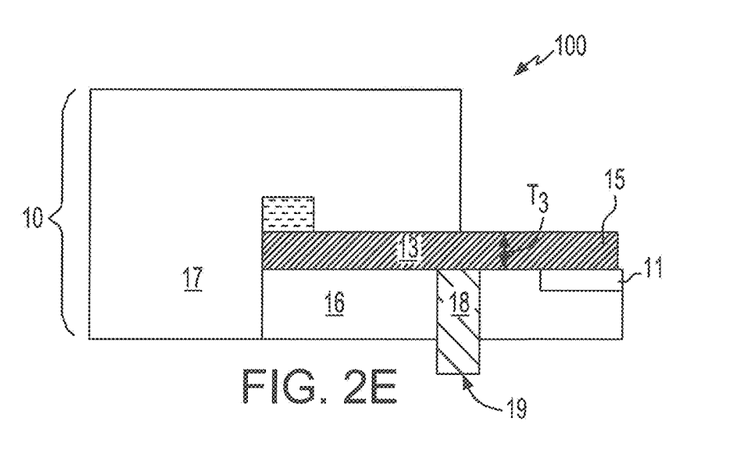
FIG. 2E is a side cross-sectional view of the holder and the spring clip for functionalizing cantilever probes that is depicted in FIG. 2A across cross-section line E-E, in accordance with one embodiment of the present disclosure.

Referring to FIGS. 2C, 2D and 2E, in one embodiment, a push stud 18 is in contact with the beam 13 of each spring clip 12 of the plurality of clips 12 between the mount end 14 of the beam 13 and the tab end 15 of the beam 13. The push stud 18 is composed of any rigid material, such as polymers or metals. The push stud 18 includes a first end that is in contact with a backside surface of the beam 13 for the spring clip 12 and a second end 19 for applying a force to the push stud 18. The push stud 18 extends through an opening in the platform portion 16 so that the second end 19 of the push stud 18 is present on the surface of the platform portion 16 that is opposite the surface of the platform portion 16 that the channel 11 is present in. Applying a force to the push stud 18 allows for the spring clip 12 to be deformed to allow for a cantilever probe to be loaded into the channel 11 of the holder 100. Releasing the force from the push stud 18 allows for the spring clip 12 to return to its original position and apply a force to the cantilever probe that is present in the channel 11, wherein the force applied to the cantilever probe retains the cantilever probe within the holder 100.

Figure 2F:
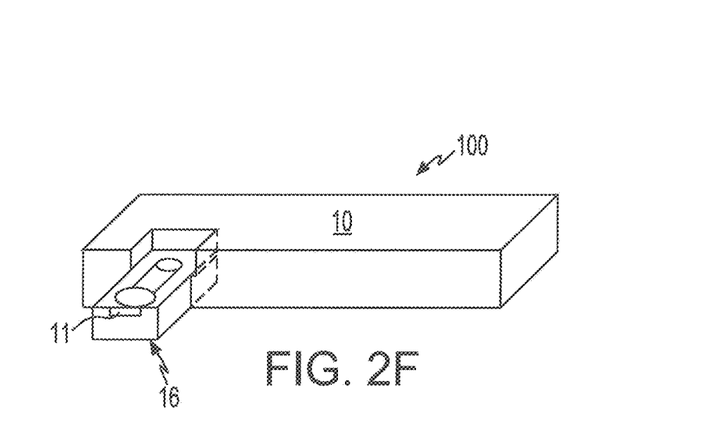
FIG. 2F is a perspective view of the holder for functionalizing cantilever probes, in which the holder includes a plurality of spring clips for fastening a plurality of cantilever probes, in accordance with one embodiment of the present disclosure.
Figure 2G:
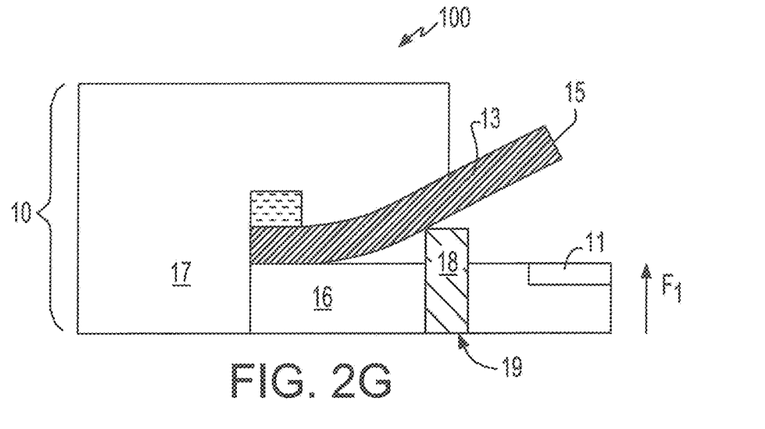
FIG. 2G is a side cross-sectional view of a spring clip on a holder that is depicted in FIG. 2E, in which a push stud is in contact with a beam of the spring clip, wherein applying a force to the push stud in a first direction deflects the beam in a first direction to move the tab end of the beam away from a first position to a second position, in accordance with one embodiment of the present disclosure.
Figure 2H:
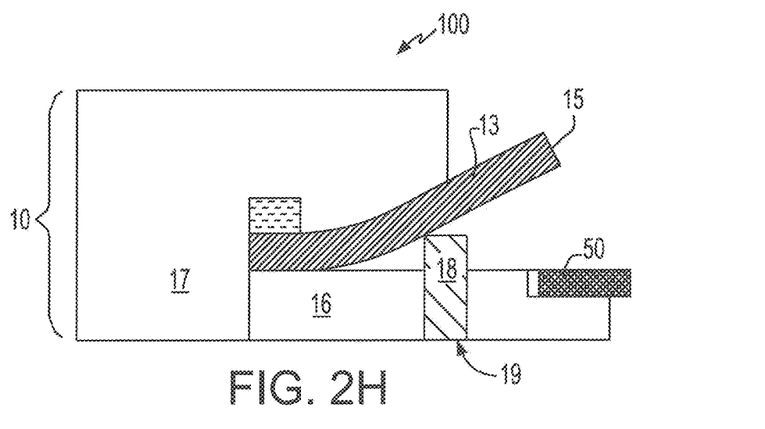
FIG. 2H is a side cross-sectional view of inserting a cantilever probe into the channel of the holder that is depicted in FIG. 2G, while the tab end of the beam of the spring clip is in the second position, in accordance with one embodiment of the present disclosure.
Figure 2I:
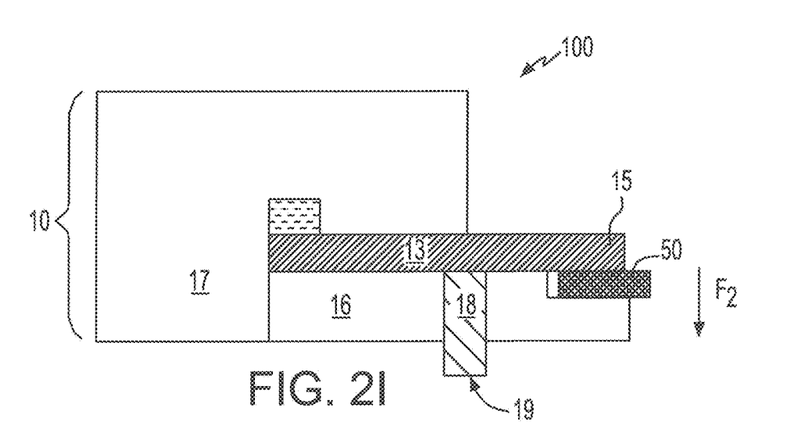
FIG. 2I is a side cross-sectional view of removing the force from the push stud that is depicted in FIG. 2H, wherein the tab end of the beam returns to the first position to retain the cantilever probe in the channel of the holder, in accordance with one embodiment of the present disclosure.

FIG. 2E depicts one embodiment of a spring clip 12 that is in a first position. In some embodiments, when the spring clip 12 is in a first position, the tab end 15 of the beam 13 of the spring clip is present in direct contact with the opening end of the channel 11 of the holder 100. Typically, when the spring clip 12 is in a first position, there is no external force being applied to the push stud 18. FIG. 2F is a perspective view of a spring clip 12 in a first position. FIG. 2G depicts applying a force to the push stud 18 in a first direction F1 deflects the beam 13 in a first direction to move the tab end 15 of the beam 13 away from the first position to a second position. The first direction in which the tab end 15 of the beam 13 is moved is away from the surface of the platform portion 16 of the holder 100 that contains the channel 11. When the tab end 15 of the beam 13 is deflected to the second position, the opening to the channel 11 is exposed to allow for a cantilever probe to be positioned in the channel 11. FIG. 2H depicts positioning a cantilever probe 50 in the channel 11 of the platform portion 16 of the holder 100 while the spring clip 12 in a second position. FIG. 2I depicts one embodiment of removing the external force from the push stud 18. By removing the external force from the push stud 18, the deformed beam 13 of the spring clip 12 deflects back to it's original geometry and shape. The spring clip 12 deflects in a second direction F2 back to the original first position after the external force is removed from the push stud 18.

When the tab end 15 of the spring clip 12 is in the second position, a force is applied to the cantilever probe 50 that is contained in the channel 11. The force applied by the spring clip 12 to the cantilever probe 50 is in a direction that is opposite the force for deforming the beam 13 of the spring clip 12 from the first position to the second position. The force applied by the spring clip 12 to the cantilever probe 50 retains the cantilever probe 50 within the channel 11 of the holder 100. To remove the cantilever probe 50 from the channel 11 of the holder, an external force is applied to the push stud 18 to move the tab end 15 of the push stud 18 from a first position to a second position.

In some embodiments, the holder 100 that is depicted in FIGS. 2A-2I may be employed in a process for functionalizing cantilever probes by dipping the cantilever probes in a functionalization solution. The method may begin with providing a holder 100, as described above with reference to FIGS. 2A-2I. More specifically, the holder 100 may have a plurality of channels 11 each having a width for accepting a cantilever probe 50 and a plurality of clips 12 each having a beam 13 extending over the plurality of channels 11. In one embodiment, a plurality of cantilever probes 50 are fastened to the plurality of channels 11 of the holder 100 by the plurality of clips 12. The cantilever probes 50 are fastened within the plurality of channels 11 by the spring clips. One embodiment of fastening the cantilever probes 50 within the channels 11 of the holder 100 is described in more detail above with reference to FIGS. 2G-2I. More specifically, as described above with reference to FIGS. 2E-2I, the fastening of the plurality of cantilever probes 50 to the plurality of channels 11 of the holder 100 may include applying a force to deform the beam 13 for at least one of said each of the clips 12 so that the tab end 15 of the beam 13 is moved from a first position to a second position, as described above with reference to FIGS. 2E and 2G. Thereafter, each cantilever chip 50 is positioned in the channel 11 of the holder 100, while the tab end 15 of the beam 13 for the spring clip 12 is in the second position, as described above with reference to FIG. 2H. Force that is applied to deform the beam 13 so that the tab end 15 of the beam 13 is in the second position is then removed so that the beam 13 returns from the second position to the first portion, wherein the tab end 15 for each of the clips 12 contacts the cantilever probe 50. When the tab end 15 of the beam 13 contacts the cantilever chip 50, the spring clip 12 applies a force to retain the cantilever probe 50 in the channel 11 of the holder 100.

Once the cantilever chips 50 are fastened to the holder 100, the cantilever probes 50 are functionalized by dipping the cantilever probes 50 in a functionalization solution. The functionalization solution is typically contained in a well plate, in which the number of wells within the plate and the spacing between the wells corresponds to the number of cantilever probes 50 that are fastened within the channels 11 of the holder 100 and the spacing between the adjacent channels 11 that are holding the cantilever probes 50. A well plate is a flat plate with multiple "wells" (also referred to as sample wells) used as small test tubes. In some embodiments, the well plate may have 6, 24, 96, 384 or even 1536 sample wells. Some well plates have even been manufactured with 3456 or even 9600 wells. In some well plates, the sample wells may be arranged in a 2:3 rectangular matrix. The well plate is typically composed of a polymeric material. For example, the well plate may be composed of a polymer that is selected from the group consisting of polyethylene terephthalate (PET), high density polyethylene (HDPE), polyvinyl chloride (PVC), low density polyethylene (LDPE), polypropylene (PP) and polystyrene (PS). The base of the wells within the well plate may have a base with a flat bottom, a round bottom or a v-shaped bottom.

Figure 3A:
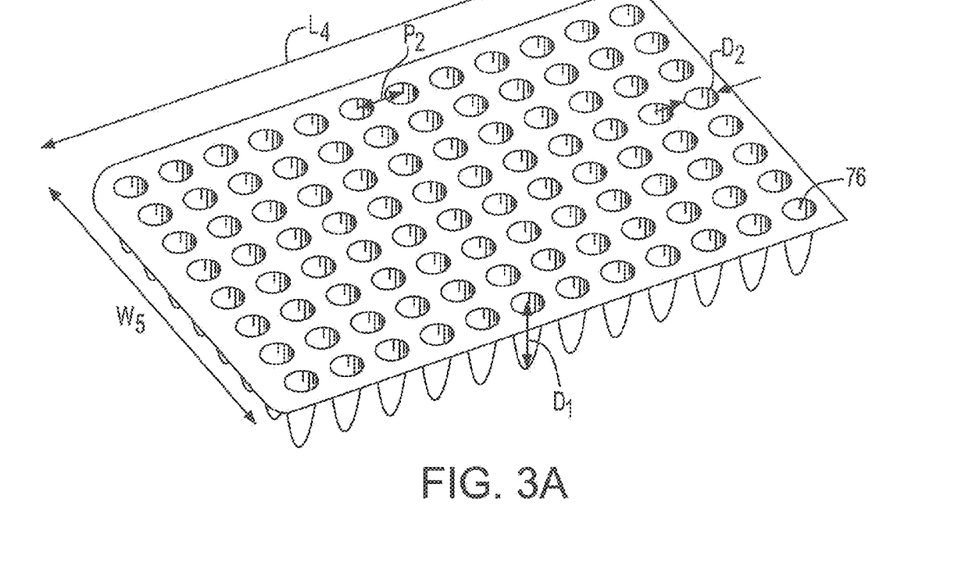
FIG. 3A is a perspective view of a standard 96 well plate, in accordance with one embodiment of the present disclosure.
Figure 3B:
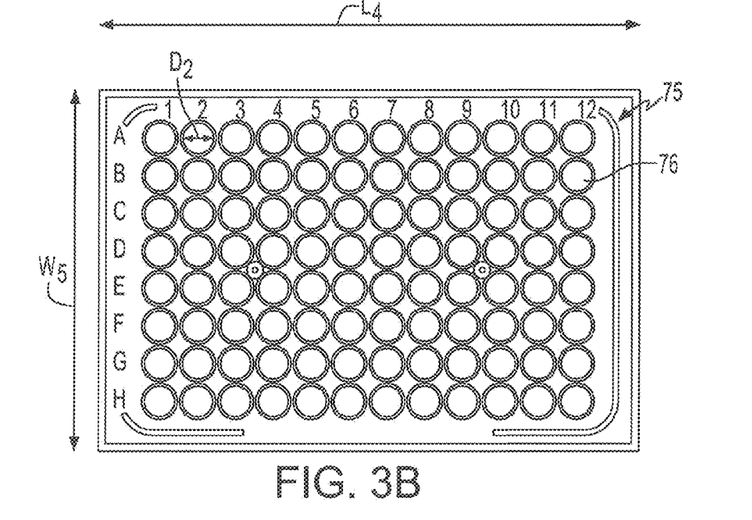
FIG. 3B is a top down view of a standard 96 well plate, in accordance with one embodiment of the present disclosure.

FIGS. 3A and 3B depict one embodiment of a standard 96 well plate 75. In some embodiments, a standard 96 well plate 75 includes 96 wells 76 that are arranged in columns of 8 wells 76 and rows of 12 wells 76. The overall length L4 of the well plate 75 may range from 120 mm to 130 mm. The overall width w5 of the well plate 75 may range from 70 mm to 80 mm. The well volume of the wells 76 may range from 185 micro liters (μL) to 2000 μL. For example, the well volume of the wells 76 may be 190 μL, 205 μL, 320 μL, 360 μL, 366 μL, 500 μL, 1000 μL or 2000 μL. In one embodiment, each well 76 may have a depth D1 ranging from 5 mm to 45 mm. In another embodiment, each well 76 may have a depth D1 ranging from 10 mm to 40 mm. In one embodiment, each well 76 may have a diameter D2 that ranges from 4 mm to 8 mm. In another embodiment, each well 76 may have a diameter D2 that ranges from 5 mm to 7 mm. In some examples, the wells 76 may have a tapered sidewall so that the diameter at the base of the well 76 is less than the diameter at the opening to the well 76.

In some embodiments, the pitch P2 is the dimension that is separating adjacent wells 76 for the plurality of wells 76 in the well plate 75. The pitch P2 is the center to center distance between adjacent wells 76 for the plurality of wells 76 in the well plate 75. The center of the well 76 for the purpose of determining the pitch P2 is the midpoint of the diameter D2 for the well 76. In some examples, the pitch P2 separating the adjacent wells 76 may range from 5 mm to 15 mm. In another example, the pitch P2 separating the adjacent wells 76 may range from 8 mm to 10 mm. In one example, the pitch P2 separating the adjacent wells 76 is equal to 9 mm. It is noted that the above example of the pitch P2 separating adjacent wells 76 in the well plate 76 is provided for illustrative purposes only, and is not intended to limit the present disclosure to only this example. In one example, the pitch P1 separating adjacent channels for the plurality of channels 11 in the holder 100 depicted in FIGS. 2A-2I is selected to correspond to the pitch P2 separating adjacent wells 76 in a well plate 75, such as the standard 96 well plate depicted in FIGS. 3A and 3B.

Figure 4:
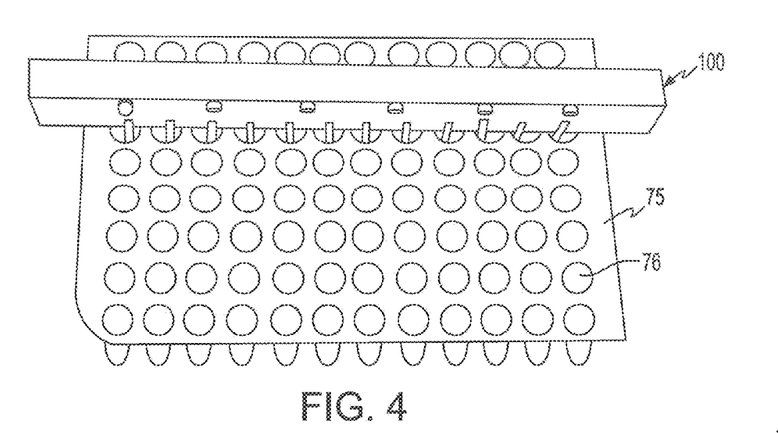
FIG. 4 is a perspective view depicting cantilever probes contained within a holder being applied to the wells of a standard well plate, in accordance with one embodiment of the present disclosure.

The functionalization solution that fills the wells 76 in the well plate 75 may provide for direct or indirect functionalization. For indirect functionalization, the cantilever probe may first be coated with a metallic coating, such as a gold coating. The typical indirect functionalization scheme can include coating of the cantilever probes 50 with gold and other metals followed by incubation with bifunctional ligands containing one thiol end. The desired ligands may have a thiol groups incorporated into their structure by chemical synthesis, or the thiol compound may have an amine or other functional group that will bind or can be coupled to the desired ligand. The thiol compounds used are generally alkane thiols. In one example, to provide the thiol compounds for functionalizing the gold coated cantilever probe, the wells 76 of the well plate 75 may be filled with a functionalization solution that includes reagents containing sulfhydryl groups or disulfide bonds known to bond to gold surfaces, such as the amino acid cysteine, the amino acid dimer cysteine, and peptides and proteins that have these amino acids in their structure; thioglucose, thiocellobiose, dithiotreitol, erythritol, and other saccharides and polysaccharides that have sulfhydryl or disulfide groups incorporated into their structures; reagents from the group of thioalkanes or mercaptans including mercaptoethanol, thioethane, thiopropane, and other thioalkanes; and other molecular species that contain thiol groups, including bifunctional reagents, such as cysteamine (synonym 2-aminoethanethiol) or 3-mercaptopropionic acid. The cantilever probes contained by the holder 100 are then applied to the wells 76 of the well plate 75, as depicted in FIG. 4. Residence time for the cantilever probes in the wells 76 filled with the functionalization solution may range from 30 seconds to 5 minutes.

In another embodiment, the cantilever probes are functionalized using a direct functionalization method, in which the silicon (Si) containing cantilever probes, e.g., silicon nitride cantilever, are treated with a functionalization solution that includes bifunctional silanes. In some embodiments, when the cantilever probes are functionalized using the direct functionalization method they are not coated with a gold containing coating. Examples of bifunctional siloxyl reagents that may be employed in the functionalization solution for direct functionalization of the cantilever probes include 3-aminopropyltriethoxysilane, ethyltrimethoxysilane, bis(2-hydroxyethyl)-3-aminopropyl triethoxysilane, N-(triethoxysilylpropyl) gluconamide, and N-(trimethoxysilylpropyl)-ethylenediamine triacetic acid; other bifunctional siloxyl reagents that are available commercially or can be synthesized from the aforementioned bifunctional siloxyl reagents by chemical reaction with those siloxyl reagents.

Figure 5A:
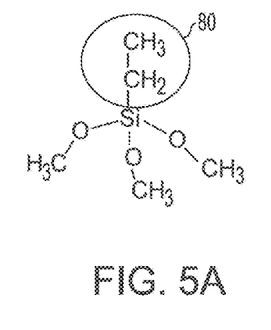
FIG. 5A depicts the chemical structure of ethyltrimethoxysilane as used as a component of a functionalization solution, in accordance with one embodiment of the present disclosure.
Figure 5B:
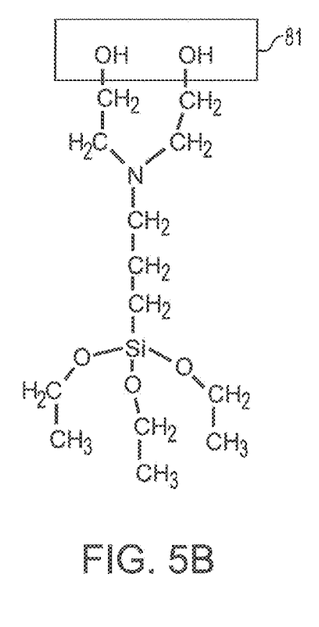
FIG. 5B depicts the chemical structure of bis(2-hydroxyethyl)-3-aminopropyl triethoxysilane as used as a component of a functionalization solution, in accordance with one embodiment of the present disclosure.
Figure 5C:
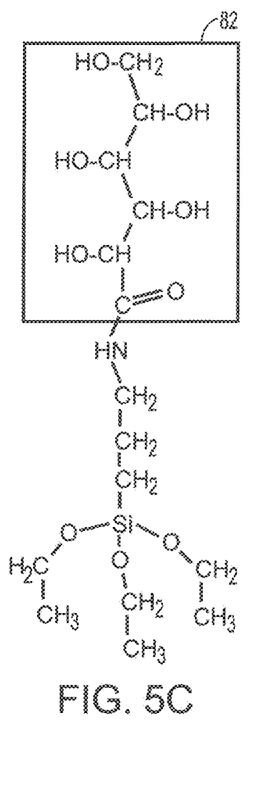
FIG. 5C depicts the chemical structure of N-(triethoxysilylpropyl) gluconamide as used as a component of a functionalization solution, in accordance with one embodiment of the present disclosure.

FIG. 5A depicts the chemical structure of ethyltrimethoxysilane. The circled portion of the chemical structure identified by reference number 80 in FIG. 5A provides a hydrophobic character to silicon surfaces following functionalization, as it is an ethyl group that cannot form hydrogen bonds with water or other chemicals. FIG. 5B depicts the chemical structure of bis(2-hydroxyethyl)-3-aminopropyl triethoxysilane. The circled portion of the chemical structure identified by reference number 81 depicted in FIG. 5B are non-specific hydroxyls, in that the hydroxyl bonds are not presented in the positions specific to glucose. FIG. 5C depicts the chemical structure of N-(triethoxysilylpropyl) gluconamide. This chemical has a chemical structure corresponding to that of gluconic acid, the sugar acid corresponding to the product of glucose that has its aldehyde group at C1 oxidized to a carboxylate, that has been coupled to the amine group of APTES through an amide bond. The circled portion of the chemical structure identified by reference number 82 depicted in FIG.

5C provides glucose specific hydroxyls, which have the spatial orientation to form hydrogen bonds with hydroxyl groups of the component glucose units on the surface of cellulose. The gluconamide moiety is also expected to form specific bonds with glucose or glucuronic acid components of hemicellulose, and, with lesser affinity due to the differences in the chemical structures, also with hydroxyl groups of other carbohydrate polymers such as xylan.

Referring to FIG. 4, the wells 76 of the well plate 75 may be filled with a functionalization solution that includes one of the aforementioned bifunctional silanes before the cantilever probes contained by the holder 100 are dipped into the wells 76 of the well plate 75. The aforementioned bifunctional silanes may be present in the functionalization solution in amounts ranging from 1% to 50%, in which the remainder of the functionalization solution is an alcohol, such as ethanol. In another embodiment, the bifunctional silanes may be present in the functionalization solution in amounts ranging from 5% to 30%, in which the remainder of the functionalization solution is an alcohol, such as ethanol. In yet another embodiment, the bifunctional silanes may be present in the functionalization solution in amounts ranging from 10% to 20%, in which the remainder of the functionalization solution is an alcohol, such as ethanol. Residence time for the cantilever probes in the wells 76 filled with the functionalization solution including the bifunctional siloxyl reagents may range from 30 seconds to 5 minutes. In another embodiment, the residence time for the cantilever probes in the wells 76 filled with the functionalization solution including the bifunctional siloxyl reagents may range from 1 minute to 3 minutes. In one example, the residence time for the cantilever probes in the wells 76 filled with the functionalization solution including the bifunctional siloxyl reagents may by 2 minutes.

In some embodiments, after the cantilever probes that are contained within the holder 100 have been applied to the functionalization solution that is contained within the wells 76 of the well plate 75, the cantilever probes 50 are removed from the functionalization solution and rinsed with water, such as deionized or distilled water ($H_2O$). Following rinsing, the cantilever probes may be dried. The cantilever probes may be removed from the holder 100 at any time after the cantilever probes have been applied to the functionalization solution.

Figure 6A:
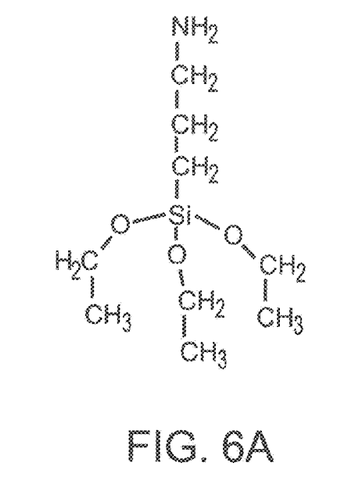
FIG. 6A depicts the chemical structure of 3-Aminopropyl TriethoxySilane (APTES) as used as a component of a functionalization solution, in accordance with one embodiment of the present disclosure.

Other methods for direct functionalization of the silicon (Si) containing cantilever probes that are contained within the holder 100 include functionalization of the silicon (Si) with 3-Aminopropyl TriethoxySilane (APTES) followed by water-soluble carbodiimide catalyzed coupling, e.g., using 1-ethyl-3-(3-dimethylaminopropyl) carbodiimide (EDC; synonym N-(3-dimethylaminopropyl)-N-ethyl carbodiimide), of the ligand biomolecule to the amino groups of the functionalized silicon (Si). The chemical structure of 3-Aminopropyl TriethoxySilane (APTES) is depicted in FIG. 6A. In some embodiments, the initial reaction pathways may include (1) Schiff-base condensation of oligosaccharide aldehydes with the amino groups of APTES-functionalized silicon for 2 hours to 18 hours followed by reduction of the labile Schiff-base bond to a more stable secondary amine with sodium borohydride; (2) disulfide formation between the thiol group of thiocellobiose or thioglucose with 4-mercaptopropyl trimethoxysilane-functionalized silicon by incubation for 18 hours; and (3) carbodiimide-catalyzed coupling of amine groups of APTES-functionalized glass to carboxylate groups of molecules to impart the desired specificity, including proteins with surface-available carboxylate groups, such as cellulase proteins, sugar acids, such as gluconic and cellobionic acids, phenyl propanoic or benzoic acid compounds such as ferulic, cinnamic, coumaryl, and vanillic acids, and other natural or synthetic compounds containing carboxylate groups. Another method (4) uses two steps to couple compounds with amino groups through a dicarboxylic acid spacer to APTES-functionalized silicon, in which first a dicarboxylic acid such as succinic acid is coupled using water-soluble carbodiimide to the amine groups of the APTES-functionalized silicon, followed by washing to remove uncoupled reactants, then proteins or other molecules of interest that contain amine groups are added to the succinate-APTES-functionalized silicon with fresh water-soluble carbodiimide, resulting in coupling of these molecules to the silicon through the succinate spacer. In all of the aforesaid methods that utilize EDC for coupling of carboxylate and amine groups, the reagent N-hydroxysuccinimide can be added to facilitate the reaction, as described in the Thermoscientific Pierce Cross-Linking Handbook and other literature. In another method, similar attachment chemistries can be carried out in organic solvents such as dichloroethane using cyclohexylcarbodiimide, for example, to attach peptides during peptide synthesis to the silicon surfaces.

Figure 6B:
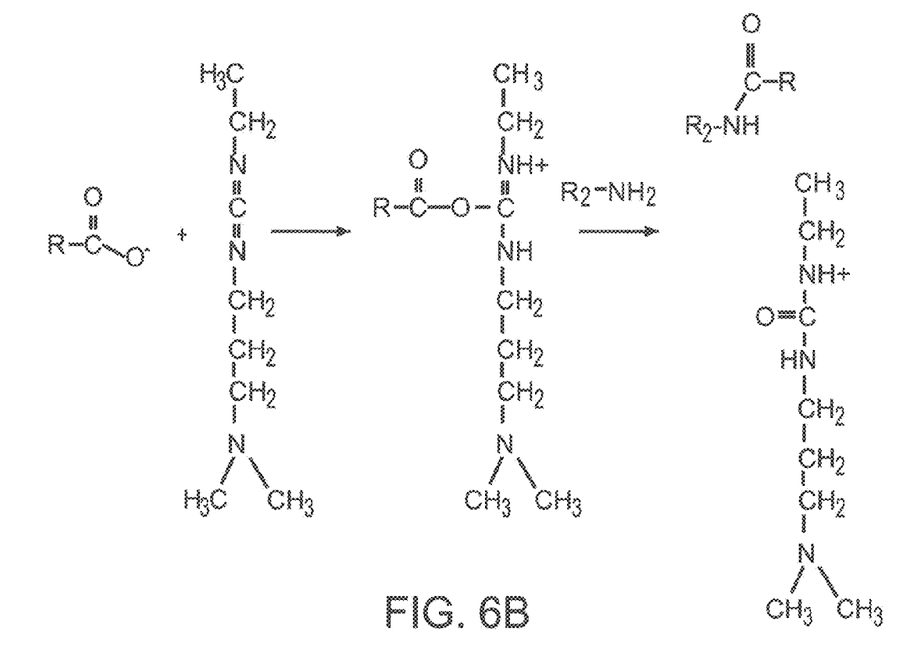
FIG. 6B depicts the chemical structure of carbodiimide1-ethyl-3(3-dimethylaminopropyl)carbodiimide hydrochloride (EDC) as used as a component of a functionalization solution, in accordance with one embodiment of the present disclosure.

In some embodiments, specific molecules can be attached to silicon cantilevers that have been functionalized with 3-aminopropyl triethoxysilane (APTES) using certain chemical reactions that couple those molecules to the APTES amine group. The concept was demonstrate by the coupling of *Trichoderma reesei* cellulase proteins (Sigma-Aldrich, St. Louis, Mo., USA) to APTES-coated silicon chips using a 2 mM solution of the water-soluble carbodiimide1-ethyl-3(3-dimethylaminopropyl)carbodiimide hydrochloride (EDC) for 20 minutes in aqueous solution and was terminated by addition of ammonium acetate, pH 7, to a final concentration of 0.1 M. The chemical structure of carbodiimide 1-ethyl-3 (3-dimethylaminopropyl)carbodiimide hydrochloride (EDC) and its coupling reaction are depicted in FIG. 6B. During the reaction, the carbodiimide1-ethyl-3(3-dimethylaminopropyl)carbodiimide hydrochloride (EDC) is a water soluble coupling reagent, which is widely used to form stable covalent amide bonds between two molecules, particularly proteins, of which one contains a carboxylate group and the other contains an amine group (for example, as described in the Thermoscientific Pierce Cross-Linking Handbook). As shown in FIG. 6B, starting from the left, a carboxylate group of a molecule, with the rest of the molecule generically denoted as "R" (FIG. 6B, left), reacts with EDC to form an unstable intermediate compound. Another type of molecule which contains an amine group, the rest of the molecule being generically denoted as "$R_2$", reacts with the carboxylate-EC intermediate, forming a bond with the carboxylate group and displacing the EDC as a diacyl urea. The resulting product is a molecule formed of R and $R_2$ joined by a amide bond formed from then amine group that was on $R_2$ and the carboxylate group that was on R. In one embodiment, successful attachment of the commercially obtained cellulase enzymes from the fungus *Trichoderma reesei* to silicon chips could be demonstrated by assay of cellulase activity with the fluorescent substrate 4-methylumbelliferyl beta-cellobioside.

The following examples are provided to further illustrate the methods and structures of the present disclosure and demonstrate some advantages that arise therefrom. It is not intended that the present disclosure be limited to the specific examples described herein.

Direct Functionalization of Cantilevers

Cantilever probes 50 were prepared including a silicon nitride cantilever 51 and a silicon chip 52, as described above with reference to FIGS. 1A and 1B. Before beginning the functionalization procedure, the cantilevers and chips were cleaned with a UV-ozone cleaner (Bioforce Nanosciences, Ames, Iowa). A holder 100 was provided having channels 11 and platform portions 16 corresponding to a standard 96 well plate, as describe with reference to FIGS. 2A-2I and FIGS. 3A and 3B. The holder 100 was employed to functionalized twelve cantilever probes 50 simultaneously. The 96 well plate 75 was prepared for the modification procedure by preloading the wells 76 with modification solutions and sterile distilled water for washes. The volume of the modification solution and the sterile distilled water in each of the wells 76 was equal to 0.250 ml per well. Three cantilevers 50 were functionalized for each set of compositions for the functionalization solutions. The functionalization solutions included a control of 100% ethanol, 20% ethyltrimethoxysilane in ethanol, 10% bis(hydroxyethyl)-aminopropyltriethoxysilane, and 10% trimethoxysilane N-propyl gluconamide. Residence time for the cantilever probes 50 in the functionalization solution was 2 minutes. After the cantilever probes 50 were applied to the functionalization solution, the cantilever probes 50 were rinsed with water, and dried in a vacuum.

Following functionalization of the cantilever probes 50, calibration of the adhesive forces for each of the cantilever functionalization types was carried out with silicon (Si) chips that had been ozone-cleaned, and then coated with 20% ethyltrimethoxysilane, 10% bis(hydroxyethyl)-aminopropyltriethoxysilane, 10% trimethoxysilyl N-propyl gluconamide, or 3-mercaptopropyltrimethoxysilane (sulfhydryl instead of hydroxyl groups) in ethanolic solution followed by washes with water. A tapping mode atomic force microscope, the Nanoscope Ma (Digital Instruments, Santa Barbara, Calif.) was used for the measurements, which were carried out in ultrapure nitrogen gas with relative humidity <4%. The measured adhesive forces correspond to the matching hydrogen bonds, while glucose-specific matched to glucose specific had the highest adhesive force, as indicated by the phase angle atomic force microscope measurements taken using the functionalized cantilever probes 50 recorded in Table 1. The cantilever and silicon chip designated as "not treated" were not subjected to the functionalization procedure. The cantilever and silicon chip designated as "control" were treated with ethanol only without the addition of a siloxyl reagent during the functionalization procedure.

TABLE 1

| Cantilever Functionalization | Silicon chip functionalization | | | |
|---|---|---|---|---|
| | Hydrophobic | Sulfhydryl | Non-specific hydroxyl | Glucose-specific |
| Not treated | 0 | 0 | 0 | 0 |
| Control | 0 | 0 | 0 | 0 |
| Hydrophobic | 0.4 | 0 | 0.1 | 0.1 |
| Non-specific hydroxyl | 0.1 | 0.2 | 0.7 | 0.8 |
| Glucose-specific | 0 | 0.2 | 1.1 | 2.0 |

Table 1 includes the phase angle measurements of attractive forces between functionalized cantilevers and functionalized silicon (Si) chips. The glucose-specific functionalized silicon (Si) chips and the glucose-specific functionalized cantilevers were both functionalized with trimethoxysilyl N-propyl gluconamide, and these had the highest adhesive force to each other due to the expected ability to form multiple hydrogen bonds with optimal alignment through the matching of the multiple adjacent hydroxyl groups of the gluconamide moiety. The adhesive forces as measured by the phase angles are highest for the glucose-specific cantilever tested on the glucose-specific silicon chip, due to the matching of the hydroxyl groups along the molecules. There are a total of five hydroxyl groups per gluconamide molecule, with a steric orientation at the carbons that allows two to three hydroxyl bonds to form between two adjacent gluconamide molecules. The steric orientation of the hydroxyl groups on the gluconamide backbone correspond to those of glucose, the component monomer of cellulose, enabling spacing and orientation to match those of the cellulose surface. The non-specific hydroxyl functionalized silicon chips and the non-specific hydroxyl functionalized cantilevers where both functionalized with bis(hydroxyethyl)-aminopropyltriethoxysilane. Due to the chemical structure of this compound, in which single hydroxyl groups are located at the ends of pendant ethyl groups, each hydrogen bond is formed separately without the alignment observed for the glucose-specific gluconamide functionalization groups.

The observed attractive forces between the non-specific hydroxyl modified cantilever and the non-specific hydroxyl silicon chip as well as the glucose-specific functionalized silicon chip are lower than those observed for the glucose-specific cantilever matched with the glucose-specific functionalized silicon chip. These results are consistent with the formation of fewer hydrogen bonds between the cantilevers and the silicon chips in the case of the non-specific hydroxyl functionalization. The sulfhydryl functionalized silicon chip was functionalized with 3-mercaptopropyltrimethoxysilane. The sulfhydryl groups on the mercaptoproplyltrimetoxysilane-functionalized silicon chip are able to form hydrogen bonds with the hydroxyl groups of the non-specific hydroxyl modified and glucose-specific modified cantilevers, but phase angle observed is smaller than that observed for the silicon chips functionalized with the reagents that possess hydroxyl groups. This result corresponds to the expected lower energy of the hydrogen bond formed by the hydrogen of a hydroxyl group with a sulfur atom of a sulfhydryl group compared to that of the hydrogen bond with the oxygen of another hydroxyl group. The hydrophobic functionalized silicon chips and the hydrophobic functionalized cantilevers were both functionalized with ethyltrimethoxysilane. The phase angle observed indicates that the hydrophobic cantilever binds with its highest affinity to the hydrophobic silicon chip. As expected, due to the lower energy of hydrophobic interactions, the phase angle is lower than those observed for the hydrogen bonds between hydroxyl groups observed for the other cantilever and silicon chip pairs.

Figure 7A:
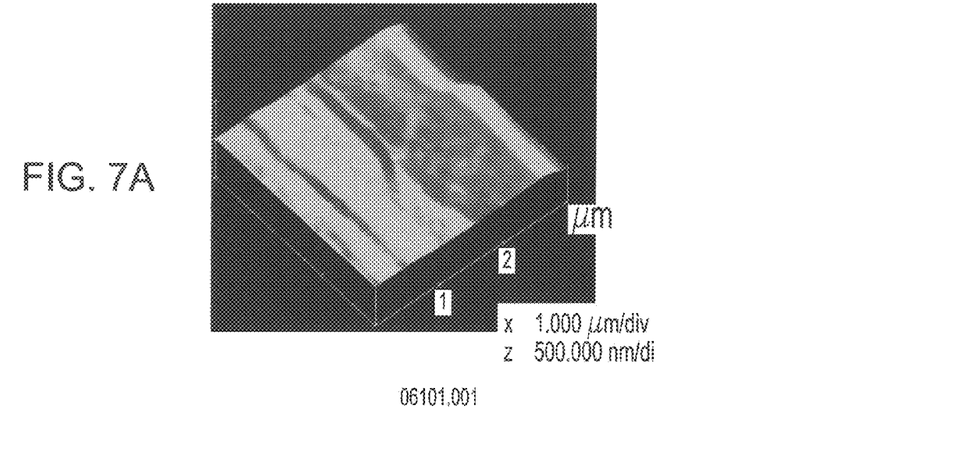
FIG. 7A depicts an image of cellulose isolated from switchgrass that is taken with an atomic force microscope in tapping mode, in accordance with one embodiment of the present disclosure.
Figure 7B:
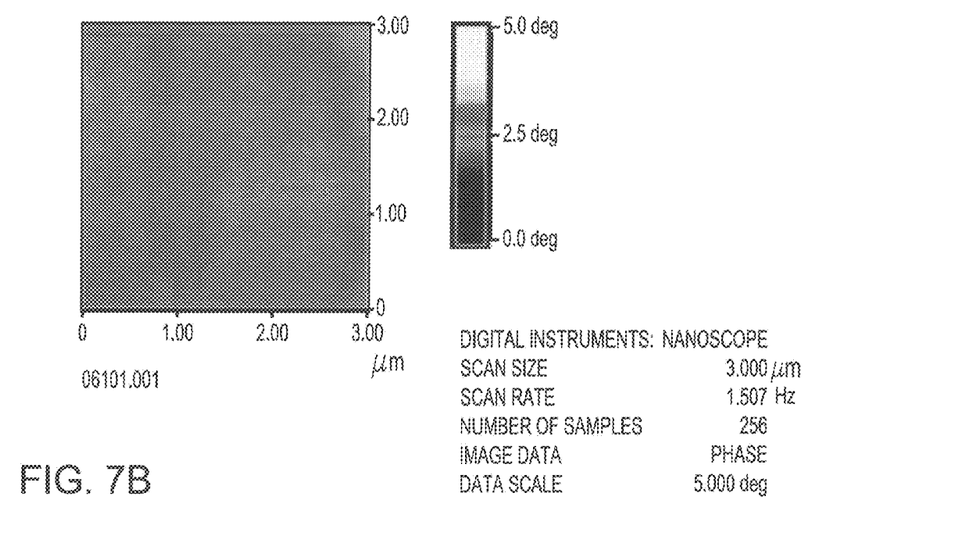
FIG. 7B depicts an image produced by a glucose specific functionalized cantilever in an atomic force microscope in chemical force measurement mode, in accordance with one embodiment of the present disclosure.
Figure 8A:
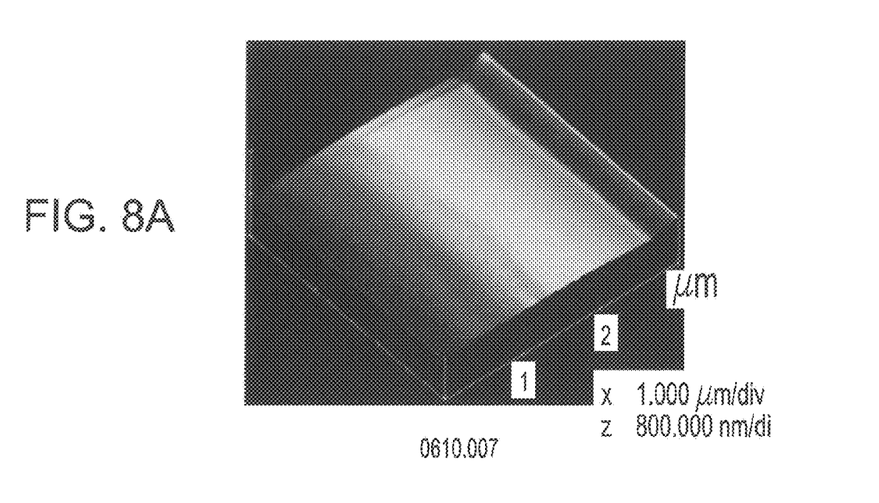
FIG. 8A depicts an image of extract free switchgrass taken with an atomic force microscope in tapping mode, in accordance with one embodiment of the present disclosure.
Figure 8B:
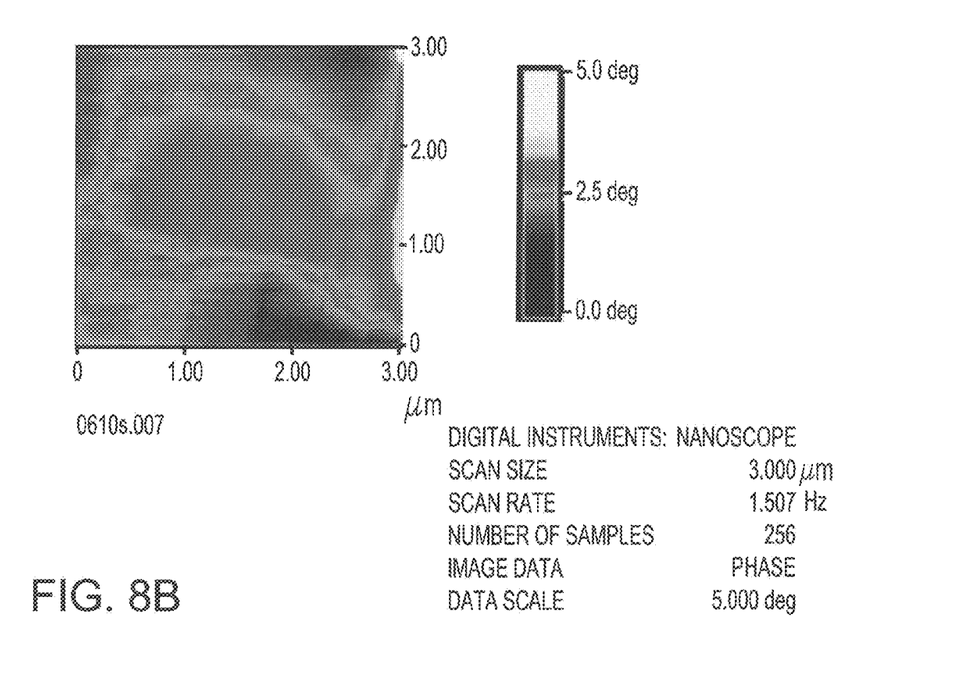
FIG. 8B depicts an image produced from the extract free switchgrass by a glucose specific functionalized cantilever in an atomic force microscope in chemical force measurement mod, in accordance with one embodiment of the present disclosure.

Following calibration, the glucose specific functionalized cantilevers were used to image switchgrass samples with different amounts of surface accessible cellulose. These were purified switchgrass cellulose, as depicted in FIGS. 7A and 7B, and extractive-free switchgrass, as depicted in FIGS. 8A and 8B. FIG. 7A depicts cellulose isolated from switchgrass imaged with an atomic force microscope in tapping mode, and FIG. 7B depicts an image produced by a glucose specific functionalized cantilever, i.e., a cantilever functionalized with trimethoxysilyl N-propyl gluconamide, in an atomic force microscope in chemical force measurement mode. The image included in FIG. 7B illustrates the glucan content to be relatively uniform at the intensity expected for isolated cellulose. FIG. 8A depicts extractives-free switchgrass imaged with an atomic force microscope in tapping mode, and FIG. 8B depicts an image produced from the extract free switchgrass by a glucose specific functionalized cantilever, i.e., a cantilever functionalized with trimethoxysilyl N-propyl gluconamide, in an atomic force microscope in chemical force measurement mode.

Measured force was uniform across the surface of the cellulose depicted in FIGS. 7A and 7B, while the surface of the extractives-free switchgrass depicted in FIGS. 8A and 8B showed variation with areas of differing affinity to the probe, consistent with the presence of cellulose, hemicellulose, and lignin present in this sample.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for functionalizing cantilevers comprising:
   providing a holder comprising a plurality of channels each having a width for accepting a cantilever probe and a plurality of clips each having a beam extending over the plurality of channels;
   fastening a plurality of cantilever probes to the plurality of channels of the holder, wherein each cantilever probe of the plurality of cantilever probes is fastened within each channel of the plurality of channels by the beam for each of the plurality of clips;
   filling wells that are present in a well plate with a functionalization solution, wherein adjacent wells in the well plate are separated by a dimension that is substantially equal to a dimension separating adjacent channels of the plurality of channels; and
   applying said each cantilever probe of said plurality of cantilever probes that are fastened within the plurality of channels of the holder into the wells containing the functionalization solution that is present in the well plate.

2. The method of claim 1, wherein the plurality of channels ranges from 1 to 20, and the width of the channels ranges from 1 mm to 5 mm.

3. The method of claim 1, wherein the plurality of channels is equal to 12, the width of the channels is less than 1.6 mm, the well plate is a 96 well plate, and the wells in the well plate have a volume of 0.250 ml.

4. The method of claim 1, wherein a base portion of the beam for each of the plurality of clips is attached to the holder at an end portion of the channel, and a tab end of the beam for each of the plurality of clips extends over the channel.

5. The method of claim 4, wherein the beam is composed of a metal that substantially returns to its original shape following bending.

6. The method of claim 4, wherein the fastening of the plurality of cantilever probes to the plurality of channels of the holder comprises:
   applying a force to deform the beam for at least one of said each of the clips so that the tab end is moved from a first position to a second position;
   positioning said each cantilever probe for the polarity of cantilever probes in a channel of the plurality of channels for the holder while the tab end is the in the second position; and
   removing the force so that the beam returns from the second position to the first portion, wherein the tab end for each of the clips contacts said each cantilever probe for said plurality of cantilever probes applying a force to retain said each cantilever probe in said each channel.

7. The method of claim 1, wherein the plurality of cantilever probes comprises a silicon-containing material selected from the group consisting of silicon (Si), silicon oxide ($SiO_2$), silicon nitride ($Si_3N_4$), silicon oxynitride ($SiO_xN_y$), silicon germanium (SiGe) and combinations thereof.

8. The method of claim 1, wherein said each cantilever probe of the plurality of cantilever probes has a length ranging from 100 microns to 500 microns, a width ranging from 20 microns to 50 microns, and a thickness ranging from 0.5 micron to 10 microns.

9. The method of claim 1, wherein the cantilever probes have a gold containing coating, and the applying of said each cantilever probe of said plurality of cantilever probes that are fastened within the plurality of channels of the holder into the wells containing the functionalization solution provides incubation of the cantilever probes with at least one bifunctional ligands containing one thiol end.

10. The method of claim 9, wherein the functionalization solution is selected from the group consisting of ethyltrimethoxysilane (hydrophobic), bis(2-hydroxyethyl)-3-aminopropyl triethoxysilane (randomly oriented, non-specific hydroxyl groups), N-(triethoxysilylpropyl) gluconamide (glucose-specific hydroxyl groups) and combinations thereof.

* * * * *